Figure 1:
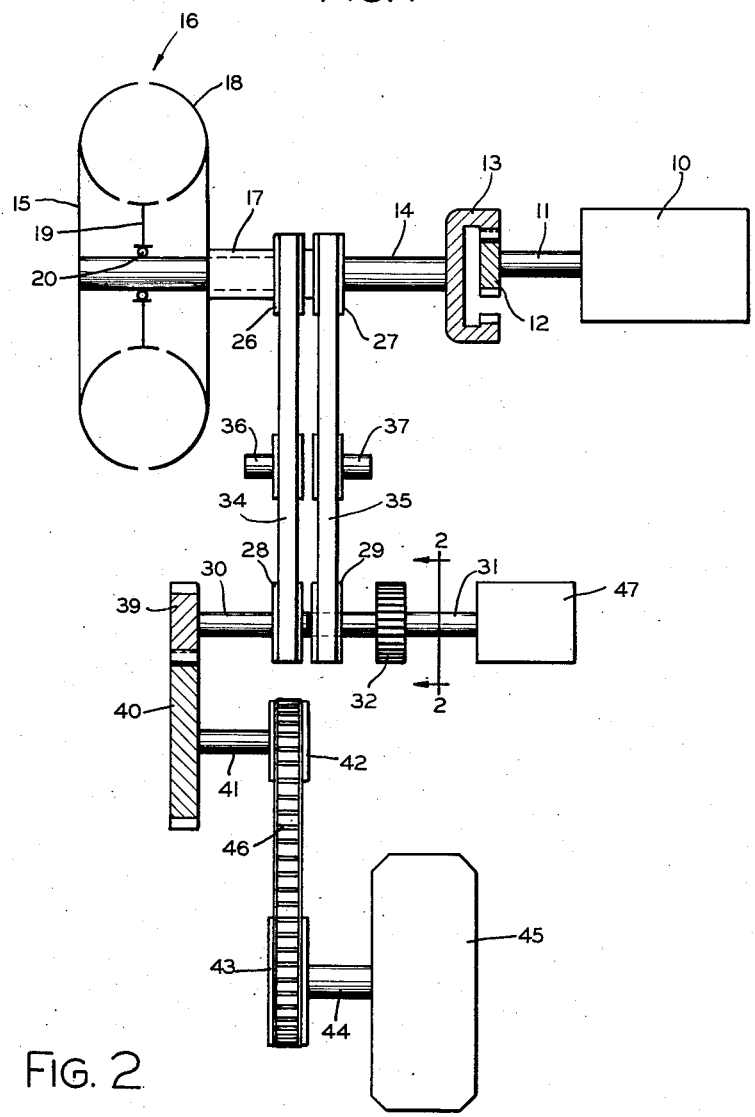

Sept. 28, 1954     R. LAPSLEY     2,690,244

DRIVE MEANS

Filed April 18, 1952

INVENTOR.
ROBERT LAPSLEY
BY
ATTYS.

Patented Sept. 28, 1954

2,690,244

UNITED STATES PATENT OFFICE 2,690,244

DRIVE MEANS

Robert Lapsley, Buchanan, Mich., assignor to Clark Equipment Company, Buchanan, Mich., a corporation of Michigan Application April 18, 1952, Serial No. 283,060

6 Claims. (Cl. 192—4)

My present invention relates generally to drive means, and, more specifically, is directed to drive means for self-propelled hand operated lift trucks.

The drive means of my present invention is particularly adapted for use in a self-propelled hand operated lift truck of a character wherein the operator walks behind the truck while effecting the various functions of picking up, transporting and depositing loads. Obviously, since the operator walks behind the truck, it is desirable to propel the truck at a relatively slow speed. In addition, since the truck is relatively small in comparison to the loads which it must handle, it is desirable to provide maximum flexibility and smoothness of the torque at the drive wheel thereof.

It is an object of my present invention to provide drive means for driving the drive wheel of a self-propelled hand operated lift truck at maximum torque and a relatively slow speed with certainty of operator control response.

It is another object of my present invention to provide drive means of the character noted wherein a torque converter is incorporated to provide for smooth acceleration of the truck.

It is still another object of my present invention to provide drive means, as noted, wherein selectively operable forward and reverse drive torque transmitting means is embodied whereby rapid and smooth shifts between forward and reverse drive may be effected.

It is a further object of my present invention to provide drive means, as above described, wherein the selectively operable forward and reverse drive torque transmitting means includes pulleys and belts.

It is a feature of my present invention that belt slippage and resultant wear are reduced to a minimum due to the fluid slippage which is permitted in the torque converter.

It is a still further object of my present invention to provide drive means, as disclosed, which is compact in design, easy to assemble and repair, and economical to operate.

In order to accomplish the aforenoted objects, I contemplate the provision of a prime mover which drives the pump element of a fluid torque converter through suitable reduction gearing. By driving the pump element of the torque converter through reduction gearing, it is possible to utilize a conventional torque converter unit, which, although being over-size in relation to the torque requirements of the truck, is in mass production and thus economical in initial cost. The driven or turbine element of the torque converter drives a pair of pulleys which, in turn, each drive, through belts, pulleys mounted on a countershaft and a lay shaft. The countershaft and lay shaft are, in turn, each provided with a gear which are in constant meshing engagement. Suitable belt tightening means is provided for selectively tensioning either one of the belts. When one of the belts is tightened, the countershaft is driven in one direction and when the other belt is tensioned, the countershaft, through the gears, is driven in the other direction. Thus, it will be readily apparent that forward and reverse drive of the drive means of my present invention is selectively effected by tensioning either one of two belts. Suitable reduction gearing and reduction chain drive means is provided between the countershaft and the drive wheel of the truck for establishing drive therebetween. In addition, brake means is associated with the lay shaft to provide for braking of the drive wheel when required.

Now, in order to acquaint those skilled in the art with the manner of constructing and using drive means in accordance with my present invention, I shall describe in connection with the accompanying drawing a preferred embodiment of my present invention.

Figure 2:
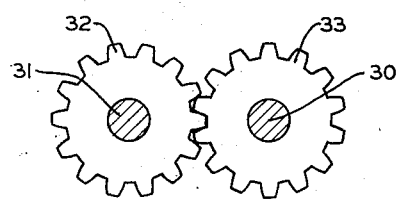

In the drawing:

Figure 1 is a generally diagrammatic showing of the drive means of my present invention; and Figure 2 is an enlarged partial side elevational view taken along the line 2—2 in Figure 1, looking in the direction indicated by the arrows, and shows the gear means through which reverse drive is effected.

Referring now to the drawing, there is indicated at 10 a prime mover which may, for example, comprise an electric motor or an internal-combustion engine. The output shaft 11 of the prime mover 10 has secured thereon a drive pinion 12 which is disposed in constant meshing engagement with an internal ring gear 13. The gear 13 is secured to the one end of a main shaft 14 which has driving connection with the pump element 15 of a torque converter unit indicated generally by the reference numeral 16. From the foregoing description, it is to be observed that the pump element 15 of the torque converter 16 is driven at a slower speed than the output shaft 11 of the prime mover 10. As a result, it is possible to utilize a conventional torque converter unit, which, although being over-size in relation to the torque requirements of the truck, is in mass production and thus economical in initial cost. Mounted concentrically about the main shaft 14 is a sleeve member 17, which, at one end, has secured thereon the turbine element 18 of the torque converter unit 16. The torque converter unit 16 further comprises a reaction or stator member 19 which is mounted in a conventional manner on a one way brake 20. The torque converter 16, upon energization of the prime mover 10, provides for smooth acceleration of the sleeve member 17.

The sleeve member 17 has secured thereon a pair of axially spaced pulley members 26 and 27. Aligned below the pulleys 26 and 27 are a pair of pulleys 28 and 29 which are mounted, respectively, on a countershaft 30 and a lay shaft 31. The axes of rotation of the shafts 30 and 31 are offset as shown in Figure 2. Secured to the lay shaft 31 is a spur gear 32 which has constant meshing engagement with a spur gear 33 secured to the countershaft 30.

Disposed about the pulleys 26 and 28 is a belt 34 and disposed about the pulleys 27 and 29 is a belt 35. The belts 34 and 35 are normally maintained slack so that rotation of the pulleys 26 and 27 will not effect rotation of the pulleys 28 and 29. Now, in order to effect drive through one of the belts 34 and 35, suitable belt tightening members 36 and 37 are associated, respectively, therewith. The belt tightening members 36 and 37 are adapted to be actuated manually through suitable linkage or cable means.

The dual belt drive is provided for effecting either forward or reverse drive to the countershaft 30. If the sleeve member 17 is rotated and the belt tightening member 36 is actuated for rendering the belt 34 taut, drive is effected from the sleeve member 17 to the countershaft 30 through the pulley 26, belt 34 and pulley 28. Drive is thus established in a forward direction. Now, if the belt tightening member 36 is rendered inoperative and the belt tightening member 37 is actuated for rendering the belt 35 taut, the countershaft 30 is driven in a reverse direction. With the belt 35 taut, drive is established between the sleeve member 17 and the countershaft 30 through the pulley 27, belt 35, pulley 29, lay shaft 31, gear 32, and gear 33. From the foregoing description, it will be apparent that I have provided drive means wherein forward drive may be simply and quickly selected. It will be readily apparent that, since the belts 34 and 35 will slip during actuation of the belt tightening members 36 and 37 shifts between forward and reverse drive may be effected smoothly.

The countershaft 30 has secured at its end a spur gear 39 which has constant meshing engagement with a spur gear 40 secured to the end of an intermediate shaft 41. The intermediate shaft 41 also carries a sprocket pinion 42 which is aligned with a sprocket gear 43 secured to the drive axle 44 of the vehicle. The drive axle 44 provides support for the drive wheel 45 of the vehicle. Trained over the sprocket pinion 42 and sprocket 43 is a chain 46. The gears 39 and 40, intermediate shaft 41, sprocket pinion 42, chain 46, sprocket gear 43, and output shaft 44 constitute the torque transmitting means by which a constant driving connection is established between the countershaft 30 and drive wheel 45.

A brake drum 47 is secured to the lay shaft 31 and is adapted to be selectively held against rotation by any suitable means such as, for example, a brake band or the like. The brake drum 47 and associated brake means is provided for braking the drive wheel 45 against rotation.

From the foregoing description, it will be readily apparent that I have provided drive means which provides a high reduction in speed between the prime mover 10 and the drive wheel 45 of the vehicle. In addition, by virtue of such high reduction in speed, a relatively large driving torque is delivered to the drive wheel 45 for propelling the vehicle. Moreover, due to the fluid slippage which is permitted in the torque converter, belt slippage and resultant wear are reduced to a minimum.

Now, while I have shown and described what I believe to be a preferred embodiment of my present invention, it will be understood that various modifications and rearrangements may be made therein without departing from the spirit and scope of my present invention.

I claim:

1. Drive means for a vehicle having a drive wheel, comprising a prime mover, a torque converter having a pump element driven by said prime mover, said torque converter having a turbine element, a pair of first pulleys driven by said turbine element, a pair of second pulleys geared for rotation in opposite directions relative to each other, belts between said first and second pairs of pulleys, said belts being normally slack, means for rendering one of said belts taut to establish drive between the pulleys about which said one belt is disposed, and torque transmitting means between said second pair of pulleys and said drive wheel.

2. Drive means for a vehicle having a drive wheel, comprising a prime mover, a torque converter having a pump element driven by said prime mover, said torque converter having a turbine element, a pair of first pulleys driven by said turbine element, a pair of second pulleys geared for rotation in opposite directions relative to each other, belts between said first and second pairs of pulleys, said belts being normally slack, means for rendering one of said belts taut to establish drive between the pulleys about which said one belt is disposed, a first gear mounted for rotation with said second pair of pulleys, a second gear having constant meshing engagement with said first gear, said second gear driving a sprocket pinion, a sprocket gear mounted for rotation with said drive wheel, and a chain trained over said sprocket pinion and said sprocket gear for establishing drive therebetween.

3. Drive means for a vehicle having a drive wheel, comprising a prime mover, a torque converter having a pump element driven by said prime mover, said torque converter having a turbine element, a pair of first pulleys driven by said turbine element, a pair of second pulleys geared for rotation in opposite directions relative to each other, belts between said first and second pairs of pulleys, said belts being normally slack, means for rendering one of said belts taut to establish drive between the pulleys about which said one belt is disposed, a first gear mounted for rotation with said second pair of pulleys, a second gear having meshing engagement with said first gear, said second gear driving a sprocket pinion, a sprocket gear mounted for rotation with said drive wheel, a chain trained over said sprocket pinion and said sprocket gear for establishing a drive therebetween, and brake means associated with said second pair of pulleys for selectively effecting braking of the latter together with said drive wheel.

4. Drive means for a vehicle having a drive wheel, comprising a prime mover having an output shaft, a drive pinion secured to said output shaft, said drive pinion having constant meshing engagement with an internal ring gear, said internal ring gear being secured to the one end of a main shaft, said main shaft at its other end having secured thereon the pump element of a torque converter, a sleeve member mounted concentrically about said main shaft, the turbine element of said torque converter being secured to said sleeve member, a pair of first pulleys secured to said sleeve member, a lay shaft, a countershaft, meshing gears secured on said lay shaft and said countershaft so that said shafts rotate in opposite directions, a pair of second pulleys one mounted on said lay shaft and the other mounted on said countershaft, belts between said first and second pairs of pulleys, said belts being normally slack, means for rendering one of said belts taut to establish drive between the pulleys about which said one belt is disposed for effecting forward drive of said countershaft, means for rendering the other of said belts taut to establish drive between the pulleys about which said other belt is disposed for effecting reverse drive of said countershaft, and torque transmitting means between said countershaft and said drive wheel.

5. Drive means for a vehicle having a drive wheel, comprising a prime mover having an output shaft, a drive pinion secured to said output shaft, said drive pinion having constant meshing engagement with an internal ring gear, said internal ring gear being secured to the one end of a main shaft, the other end of said main shaft having secured thereon the pump element of a torque converter, a sleeve member mounted concentrically about said main shaft, the turbine element of said torque converter being secured to said sleeve member, a pair of first pulleys secured to said sleeve member, a lay shaft, a countershaft, gear means between said lay shaft and said countershaft so that said shafts rotate in opposite directions, a pair of second pulleys one secured to said lay shaft and the other secured to said countershaft, belts between said first and second pairs of pulleys, said belts being normally slack, means for rendering one of said belts taut to establish drive between the pulleys about which said one belt is disposed for effecting forward drive of said countershaft, means for rendering the other of said belts taut to establish drive between the pulleys about which said other belt is disposed for effecting reverse drive of said countershaft, a first gear secured to the countershaft, a second gear having constant meshing engagement with said first gear and being secured to an intermediate shaft, a sprocket pinion secured to said intermediate shaft, an output shaft for driving said drive wheel, a sprocket gear secured to said output shaft, a chain trained over said sprocket pinion and said sprocket gear for establishing a driving connection therebetween, and brake means on said lay shaft adapted for selectively braking said lay shaft together with said drive wheel.

6. Drive means for a vehicle having a drive wheel, comprising a prime mover, a torque converter having a pump element driven by said prime mover, said torque converter having a turbine element, a pair of first pulleys driven by said turbine element, a pair of second pulleys geared for rotation in opposite directions relative to each other, belts between said first and second pairs of pulleys, said belts being normally slack, means for rendering one of said belts taut to establish drive between the pulleys about which said one belt is disposed, slippage of said belts and resultant wear being minimized due to fluid slippage occurring in said torque converter, and torque transmitting means between said second pair of pulleys and said drive wheel.

References Cited in the file of this patent

UNITED STATES PATENTS

| Number | Name | Date |
|---|---|---|
| 731,588 | Meinhard | June 23, 1903 |
| 1,160,537 | Siddall | Nov. 16, 1915 |
| 1,450,019 | Canning | Mar. 27, 1923 |
| 2,582,966 | Curtis | Jan. 22, 1952 |